(12) United States Patent
Hirsch

(10) Patent No.: US 6,203,642 B1
(45) Date of Patent: Mar. 20, 2001

(54) SUPPORT DEVICE FOR A COMPUTER MOUSE

(75) Inventor: Karl Hirsch, Pischeldorf (AT)

(73) Assignee: Hirsch & Partner GmbH, Klagenfurt (AT)

( * ) Notice: Subject to any disclaimer, the term of this patent is extended or adjusted under 35 U.S.C. 154(b) by 0 days.

(21) Appl. No.: 09/499,714

(22) Filed: Feb. 8, 2000

Related U.S. Application Data

(62) Division of application No. 09/317,598, filed on May 24, 1999, now Pat. No. 6,106,909, which is a continuation of application No. 08/891,772, filed on Jul. 14, 1997, now Pat. No. 5,948,520, which is a continuation-in-part of application No. 08/765,217, filed on Jan. 3, 1997, now abandoned, which is a continuation-in-part of application No. 08/860,815, filed on Jul. 13, 1997.

(51) Int. Cl.⁷ .................................................. A63B 39/00
(52) U.S. Cl. ..................... 156/145; 156/292; 156/308.4
(58) Field of Search ........................... 428/14, 13, 72, 428/304.4, 178, 76, 218, 192, 315.9, 318.6; 248/118, 118.1; 156/145, 146, 308.4, 292

(56) References Cited

U.S. PATENT DOCUMENTS

| 4,738,888 | 4/1988 | Pantaleo et al. ..................... 428/166 |
| 4,799,054 | 1/1989 | House .................................. 248/118 |
| 5,047,267 | 9/1991 | Pantaleo et al. ....................... 428/13 |
| 5,356,099 | 10/1994 | Sereboff ............................. 248/118.1 |
| 5,445,349 | 8/1995 | Hart ..................................... 248/118 |
| 5,445,858 | 8/1995 | Nwoko ................................. 428/71 |
| 5,948,520 | 9/1999 | Hirsch ................................... 428/13 |

FOREIGN PATENT DOCUMENTS

| 295 01 582 U | 6/1995 | (DE) . |
| 296 04 068 U | 12/1996 | (DE) . |
| 0 328 225 | 8/1989 | (EP) . |
| 2 685 112 | 6/1993 | (FR) . |
| 1046725 | 4/1963 | (GB) . |
| 96 02041 | 1/1996 | (WO) . |

OTHER PUBLICATIONS

Japanese Abstract 5–11923 (A), dated Jan. 22, 1993, Appln. No. 3–190822, filed Jul. 5, 1991, for "Input Device", Inventor Ichiro Kubota, Assignee Sony Corp.

*Primary Examiner*—Deborah Jones
*Assistant Examiner*—Abraham Bahta
(74) *Attorney, Agent, or Firm*—Alston & Bird LLP

(57) ABSTRACT

A support device for a computer mouse (mouse pad) comprises, extending over the lower foil made of foam material, at least one thin, colored liquid layer which is enclosed between two foils welded together along the edge in a liquid-tight manner and is visible through the transparent foil or foils. The liquid occupies the available cavity only incompletely and it spreads out in puddle-like patterns to define void spaces which change continuously due to the actuation of the mouse, thereby providing the mouse pad with an optically interesting appearance.

3 Claims, 2 Drawing Sheets

SUPPORT DEVICE FOR A COMPUTER MOUSE

CROSS-REFERENCE TO RELATED APPLICATION

This application is a divisional of U.S. patent application Ser. No. 09/317,598 filed May 24, 1999, now U.S. Pat. No. 6,106,909, which is a continuation of U.S. patent application Ser. No. 08/891,772 filed Jul. 14, 1997, now U.S. Pat. No. 5,948,520, which is a continuation-in-part of U.S. patent application Ser. No. 08/765,217, filed Jan. 3, 1997 now abandoned and U.S. patent application Ser. No. 08/860,815 filed Jul. 13, 1997, which are all hereby incorporated herein in their entirety by reference.

BACKGROUND OF THE INVENTION

The invention relates to a support device for a computer mouse, a so-called mouse pad, comprising a lower foil made of foam material onto which a carrier layer has been laminated and including, disposed above the carrier layer, a transparent upper foil which is welded continuously along the edge to the carrier layer and the lower foil. According to one embodiment, a liquid is situated between the carrier layer and the top foil, which liquid does not completely fill the available space.

Such support devices are used for the convenient actuation of the computer mouse. The mouse or the mouse device is moved to and fro by the user on the support device, causing the ball of the mouse to roll over the upper foil. The lower foil of foam material holds the support device on the working surface, causes the ball to roll smoothly and damps the vibrations which arise during the actuation of the keys of the mouse. support devices are frequently provided with pictorial and/or written illustrations in order to enhance their appearance or to make them serve as an advertising means.

From EP 0 328 225 A1 a mouse pad is known which is provided with an electrostatically non-charging upper layer, a deformation-resistant layer situated below the upper layer, and a lower slip-resistant layer. Such an arrangement of the mouse pad is to reduce both its electrostatic charging as well as the occurring deformations, and in addition decrease its production costs. An optically appealing design of this mouse pad is not the subject matter of this specification.

Moreover, in GB-PS 1 046 725 a finger painting device is described which is provided with a carrier layer and a transparent top foil which is welded together with the carrier layer. A colored liquid is provided between the carrier layer and the top foil which can be displaced by pressure on the top foil in the pressure zone and patterns and figures can be produced in such a way. The use of such a toy as a pad for a computer mouse is not possible without additional measures because the maintenance of technical and functional features such as the formation of a continuous rolling surface for the ball of the mouse is not ensured, for example.

SUMMARY OF THE INVENTION

The invention is based on the object of providing a support device for a computer mouse which has a particularly attractive appearance.

The invention is also based on the object of improving the optical effects achievable in a pad for a computer mouse whilst simultaneously ensuring a fault-free rolling of the ball of the computer mouse and simplifying the production of such a pad.

The solution concept in accordance with the invention is to provide at least one thin liquid layer below the transparent top foil in which the liquid, as it occupies the available space only incompletely, is distributed in a puddle-like pattern, with this distribution and accordingly the appearance changing in a substantially random manner by the actuation of the computer mouse. This affords a very interesting appearance to the support device, in particular in combination with a non-invariable imprint of pictorial and/or written illustrations onto which the at least one puddle-like liquid layer is optically superposed.

In one embodiment, a liquid layer is provided which is enclosed between the liquid-tight carrier layer and the upper foil. In another embodiment, at least two liquid layers are provided, more particularly between the liquid-tight carrier layer and a partitioning foil, between a partitioning foil and the upper foil, and optionally between adjoining partitioning foils. In one particular embodiment, a liquid layer is each provided between adjoining partitioning foils and optionally in addition between the upper partitioning foil and the upper foil. In this context the carrier layer need not be liquid tight.

The liquid layer may be subdivided quasi-vertically into two regions in the vertical dimension, each containing its own colored liquid, which provides particularly interesting optical effects. Liquid-tight welding seams between the adjoining partitioning foils are used for the subdivision into these regions. These welding seams specifically do not extend to the carrier layer or the upper foil. A welding seam extending along the surface constituting the upper surface would interfere with the rolling action of the ball of the mouse. If a welding seam were to extend to the carrier layer the manufacturing conditions would cause along that location a compression of the lower foil of foam material, resulting in an unattractive appearance and likewise possibly interfering with the rolling action of the ball.

Any pictorial and/or written imprint is preferably applied to the underside of the upper foil in reversed mirror image form, which offers the advantage that the imprint will not be scratched and no dye pigments will soil the ball of the mouse. Alternatively, an imprint is applied to the upperside of the carrier layer.

Pure vegetable oil was found suitable for the liquid(s). If damage to the mouse pad were to give rise to leakage and the emergence of liquid, persons will not be subjected to any hazards e.g. by toxicity. Moreover, vegetable oil does not evaporate through the foil or carrier layer so that the optical effect of the liquid(s) and thereby the durability of the mouse pad is ensured in the long run.

Preferably, cosmetics are admixed to the vegetable oil for coloring purposes so that likewise no hazards to persons arise from the dye stuff if such persons were to come into contact with any liquid emerging from a damaged mouse pad. All foils and layers of the support device according to the invention are preferably manufactured of PVC and are accordingly fully recyclable.

According to another preferred embodiment, at least one bag with a transparent upper side and closed on all sides is arranged between the carrier layer and the top foil, with the liquid being situated in the bag and with the bag not being fully filled by the same.

The mouse pad is thus provided, on the one part, with an appealing appearance and, on the other part, can be produced relatively simply. The liquid enclosed in the bag does not fill the same entirely and thus distributes in the form of streaks, with the distribution and, accordingly, the appearance changing substantially in a random way by the actuation of the computer mouse. The image offered to the viewer therefore changes continuously, which makes it particularly interesting. As a result of the fact that the liquid is arranged in a bag which is closed on all sides, they can be prefabricated and kept in storage. Furthermore, the welding of the top foil with the carrier layer and the bottom foil can be made without having to take any intermediately disposed liquid into account and therefore need not necessarily be leak proof. A faster reaction to customer wishes is also possible, because depending on the respective order it is possible to produce pads with differently colored liquids. It is only necessary to arrange the bag with the respective colored liquid between the carrier layer and the top foil.

Preferably, the edge of the top foil is welded continuously with the carrier layer and the bottom foil. This measure further increases the security against any leakage of the liquid from the pad, because the liquid is enclosed in a leak-proof manner in the bag and, on its part, between the carrier layer and the top foil.

An advantageous arrangement of the invention is also provided in such a way that the space between the carrier layer and the top foil is accessible from the outside. In this way the bag with a colored liquid can be exchanged, if required, against a bag with a liquid of another color, which leads to a multiplication in the number of achievable optical effects. Furthermore, the production of a pad in accordance with the invention for a computer mouse is simplified even further, because the top foil can be welded with the carrier layer and the bottom foil without the bag with the liquid being situated between the carrier layer and the top foil. This means that, on the one part, the top foil, carrier layer and bottom foil and, on the other part, the bag with the colored liquid can be produced and, if necessary, stored separate from one another and that the pad can then be finished according to customer wishes by inserting the bag between the carrier layer and the top foil.

Particularly preferably, the edge of the top foil is welded continuously with the carrier layer and the bottom foil with the exception of a section thereof. The bag with the colored liquid can be taken out or inserted between the top foil and the carrier layer through this open section. The bags can thus be exchanged in this way very easily.

It is also possible that the edge of the top foil is welded continuously with the carrier layer and the bottom foil and that mutually overlapping openings for inserting and removing the bag are arranged in the carrier layer and in the bottom foil. It is also imaginable, for example, to arrange a slot in the center or at the edge of the bottom side of the pad, through which the bag or bags could be taken out or also inserted.

Preferably, the bag is made of plastic material. Possible materials are, for example, the plastics polyvinyl chloride, polyethylene or polypropylene.

The bag advantageously consists of two foils which are continuously welded to each other at the edges. It is also possible, however, that the bag consists of one foil which is folded along a halving line and whose remaining edges are continuously welded to one another.

In a favorable further development of the invention the bag is subdivided by at least one leak-proof welding seam into at least two areas where separate liquids are disposed and which may be of different colors. This leads to particularly interesting optical effects. The rolling of the mouse ball on the top foil is not disturbed by this welding seam.

It is also intended to enclose plate-like solid bodies in the bag together with the liquid(s). They can be provided, for example, with image and/or letter imprints.

BRIEF DESCRIPTION OF THE DRAWINGS

In the following the invention will be explained in closer detail with additional advantageous details with reference to the illustrated embodiments, wherein.

DETAILED DESCRIPTION OF THE PREFERRED EMBODIMENTS

Figure 1:
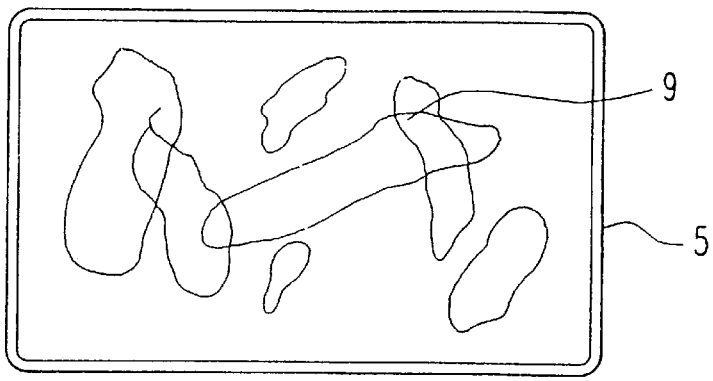
FIG. 1 shows of a support device for a computer mouse.
Figure 2:
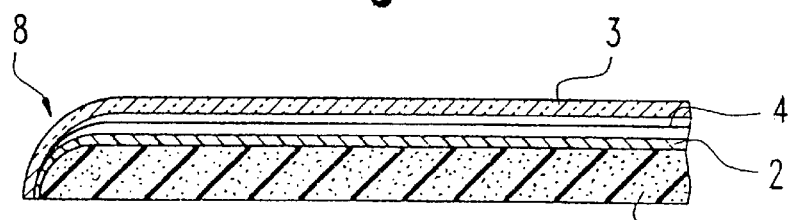
FIG. 2 shows a partial cross section through the support device according to FIG. 1.

The support device according to FIGS. 1 and 2 comprises a lower foil 1 of PVC foam material onto which a liquid-tight carrier layer 2 of PVC has been laminated. A transparent upper foil 3 (likewise of PVC), the upper surface of which, in a manner not illustrated, is slightly roughened in order to provide a reliable rolling action of the ball of the mouse, is provided on top of the carrier layer 2. A transparent partitioning foil 4 may be provided between the carrier layer 2 and the upper foil 3. All foils and the carrier layer are welded together continuously in a liquid-tight manner all around along the edge 8 of the rectangular support device.

A cavity is defined between the carrier layer 2 and the partitioning foil 4 in which a liquid is provided. The liquid can be colored and a second colored liquid of a different color is provided between the partitioning foil 4 and the upper foil 3. The liquids are composed of commercially available pure vegetable oil and thus are transparent. Glycerin has also been determined to be a suitable liquid. In a preferred embodiment, cosmetic substances are added to the transparent liquid as dye stuff to provide desired colors. For this purpose the respective liquid is applied onto the lower layer or foil without any additional confining means and subsequently the upper foil is superposed and welded onto it. This is immediately possible because of the viscosity of the vegetable oil.

For reasons of clarity the liquids are not illustrated as such in FIG. 2. In those cases the amount of liquid has been selected in such a way that the space available is not filled entirely and a plurality of bubbles or void spaces is created. In the case of mouse pads of average size the space between two foils or layers contains about 0.022 l of liquid, and in the case of larger mouse pads this amount may also be 0.025 l. This results in the liquid becoming distributed in a puddle-like pattern, with the puddle-like pattern changing continuously during the rolling action of the ball of the mouse thereover. Accordingly, the puddle-like patterns 9 indicated in FIG. 1 merely represent a momentary condition.

Figure 3:
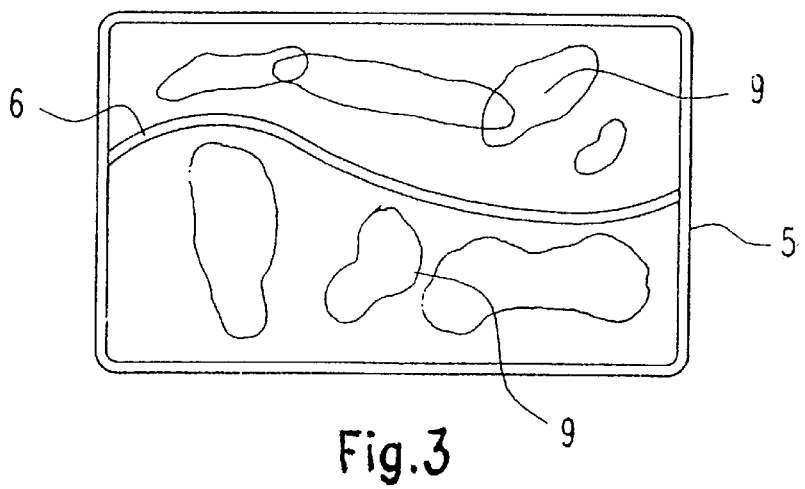
FIG. 3 shows a top view onto a different support device for a computer mouse.
Figure 4:
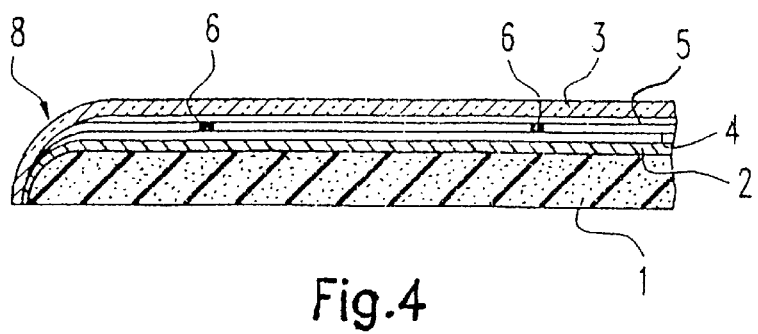
FIG. 4 shows a partial cross section through the support device according to FIG. 3.

The support device illustrated in FIGS. 3 and 4 corresponds essentially to that according to FIGS. 1 and 2. However, there are provided two liquid-tight partitioning foils 4 and 5 made of transparent PVC providing a facility to enclose colored liquid between the carrier layer 2 and the lowermost partitioning foil 4, between the partitioning foils 4 and 5 as well as between the uppermost partitioning foil 5 and the upper foil 3. In addition, the two partitioning foils 4 and 5 are interconnected by a liquid-tight welding seam 6 extending in an irregular linear pattern over the surface of the support device and subdividing the cavity between the two partitioning foils 4 and 5 into two regions, each of which may be filled with its own liquid of different color. This permits the creation of a multitude of color effects.

Any pictorial and/or written imprint is applied in reversed mirror image form to the underside of the upper foil 3, resulting of course also in a superpositioning of the optical effects generated by the puddle-shaped liquid layers with the imprint. Alternatively, an imprint may be applied to the upper surface of the carrier layer 2 and viewed through the liquid layer and/or the incompletely filled spaces in the liquid layer.

Figure 5:
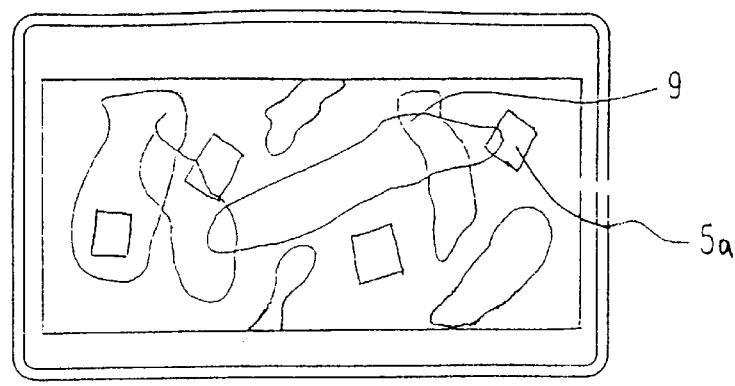
FIG. 5 shows a top view of another embodiment of a support device for a computer mouse in accordance with the invention.
Figure 6:
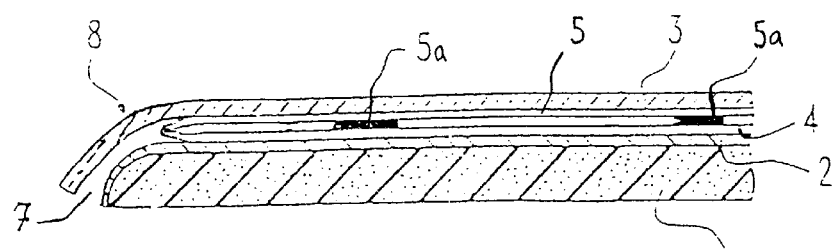
FIG. 6 shows a partial cross-sectional view through the support device in accordance with FIG. 5.

The pad in accordance with FIGS. 5 and 6 includes a completely closed bag defined by the lower partitioning foil 4 and the upper partitioning foil 5 and is situated between the carrier layer 2 and the top foil 3. In one embodiment, the bag contains a liquid which can be colored for optical effect. The top foil 3 is welded together with the carrier layer 2 and the bottom foil I at three sides of the edge 8 of the rectangular pad.

Several small plates 5a are disposed in the bag defined by the partitioning foils 4,5 whose shape is random and which are substantially rectangular in the shown example. It is also imaginable that these small plates 5a are parts of a puzzle which, when combined, will result in an image and/or a wording. The liquid is not shown separately in FIG. 6 for reasons of better clarity. Similar to the embodiment discussed above, the quantity of the liquid is measured in such a way that the space which is available in the bag is not filled completely. This leads to the consequence that the liquid distributes in form of streaks and that the streaks will change continuously during the rolling of the mouse ball. The streaks 9 indicated in FIG. 5 therefore only correspond to a momentary condition.

As can be seen from FIG. 6, one side of the edge of the top foil 3 is not connected with the carrier layer 2 and the bottom foil 1, so that an opening 7 is arranged here through which the bag can be inserted between carrier layer 2 and the top foil 3 or can be removed from there again.

Figure 7:
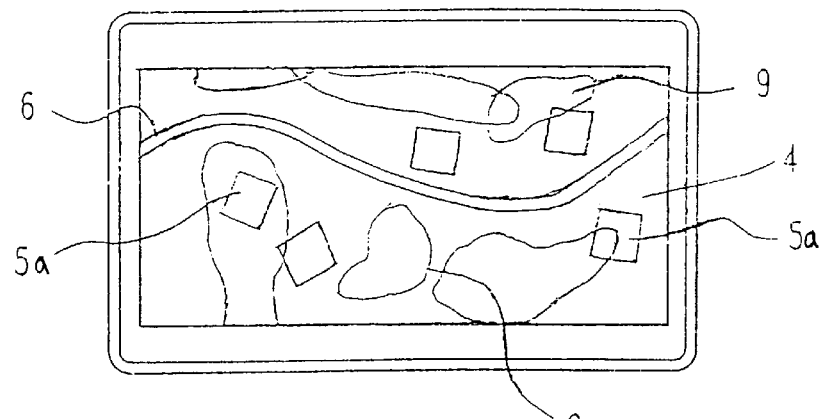
FIG. 7 shows a top view of a further embodiment of a support device for a computer mouse in accordance with the invention.
Figure 8:
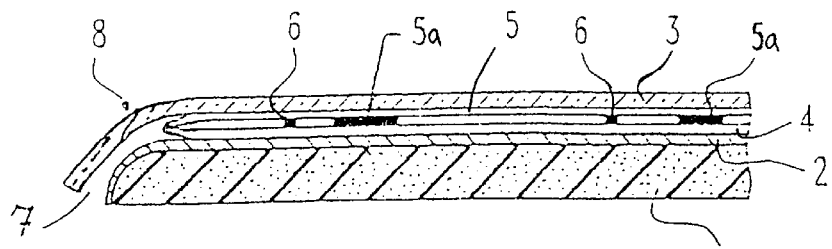
FIG. 8 shows a partial cross-sectional view through the support device in accordance with FIG. 7.

The pad shown in the FIGS. 7 and 8 corresponds principally to the one in accordance with FIGS. 5 and 6. The bag, however, is subdivided into two areas by means of a leak-proof welding seam 6 which extends in an irregular line over the area of the pad and which joins the superimposed foils 4,5 of the bag. The areas can be filled with liquids of different coloration. In this way the most diverse color effects can be produced.

That which is claimed is:

1. A method of making a support device for a computer mouse comprising the steps of:

laminating a carrier layer over a lower foil;

positioning the thus formed laminate such that the carrier layer faces upwardly;

applying a liquid to the carrier layer without using confining means to confine the liquid such that the liquid remains on the carrier layer after application thereof; and then welding a transparent upper foil to the carrier layer along a continuous liquid-tight welding seam to define the periphery of a sealed cavity within which the liquid is captured, thereby creating a support device for a computer mouse having a transparent upper foil on which the computer mouse is manipulated and a liquid layer in the support device viewable through the transparent upper foil.

2. A method as defined in claim 1 comprising the further step of disposing one or more generally flat solid bodies in the liquid layer before said welding step.

3. A method as defined in claim 1 comprising the further step of applying a reversed image to the underside of the upper foil before said welding step to create an image viewable through the transparent upper foil.

* * * * *

UNITED STATES PATENT AND TRADEMARK OFFICE
CERTIFICATE OF CORRECTION

PATENT NO. : 6,203,642 B1
DATED : March 20, 2001
INVENTOR(S) : Hirsch

It is certified that error appears in the above-identified patent and that said Letters Patent is hereby corrected as shown below:

Title page,
Related U.S. Application Data [62], after "Jan. 3, 1997, now abandoned," cancel "which is a continuation in part of" and insert -- and --.

Signed and Sealed this

Eighteenth Day of December, 2001

Attest:

JAMES E. ROGAN
*Attesting Officer*        *Director of the United States Patent and Trademark Office*